United States Patent [19]
Altschul

[11] 3,940,180
[45] Feb. 24, 1976

[54] GLARE ELIMINATING DEVICE

[76] Inventor: Louis T. Altschul, 1325 E. Lake Ave., Glenview, Ill. 60025

[22] Filed: Aug. 19, 1974

[21] Appl. No.: 498,640

[52] U.S. Cl. ............................ 296/97 D; 224/29 R
[51] Int. Cl.² ........................................... B60J 3/02
[58] Field of Search .... 296/97 K, 97 C, 97 D, 97 R, 296/97 G; 224/29 R

[56] References Cited
UNITED STATES PATENTS

| | | | |
|---|---|---|---|
| 2,706,659 | 4/1955 | Landis | 296/97 D |
| 3,328,071 | 6/1967 | Johnson | 296/97 G |
| 3,466,774 | 9/1969 | Borresen | 224/29 R |

Primary Examiner—Robert J. Spar
Assistant Examiner—Donald W. Underwood
Attorney, Agent, or Firm—Hill, Gross, Simpson, Van Santen, Steadman, Chiara & Simpson

[57] ABSTRACT

A glare eliminating device for vehicles comprised of a single element shielding portion of a rectangular shape with rounded corners. The shape of the shielding portion being sufficiently large to effectively block objectionable glare of the sun to the eyes of a motorist while permitting maximum view. The shielding portion is selectively placed in any location in front of the driver by means of a support arm having two movable joints, one attaching the arm to the shielding portion, and the other attaching the arm to the mounting bracket with sufficient frictional engagement to retain the selected relative position of the members. An engaging means comprised of a loop-and-hook, releasably-engaging cloth material having one layer disposed above the inner upper windshield molding and the other layer disposed on the mounting bracket, permitting affixation of the glare eliminating device to any desired horizontal position in front of the driver by bringing the hook and loop layers in contact with one another.

5 Claims, 4 Drawing Figures

GLARE ELIMINATING DEVICE

BACKGROUND OF THE INVENTION

1. Field of the Invention

This invention relates in general to a glare eliminating device, in particular to a novel shape of the shielding portion and means for providing substantially universal adjustment thereof.

2. Description of the Prior Art

It has always been desirable to provide an effective sun and/or headlight shield for a motorist, having a cross sectional area sufficiently large enough to obscure the objectional rays, but yet small in size as to not obstruct the driver's clear view of the road. The conventional large size fold-down visor is not suitable because of its tendency to obscure such a great portion of a driver's view in attempting to screen out the rays of the sun.

Generally, devices other than conventional sun visors utilized to eliminate glare affecting a motorist from either the sun or from the headlights of on-coming cars have been relatively complicated devices having a plurality of spaced shielding areas requiring more than a simple touch of the hand for adjustment. While many previous devices were adjustable to some extent, they were generally characterized by a limited range of adjustment. Thus, these models which offered only limited adjustment capabilities left the driver with substantial visual areas where glare from the sun could still be hazardous to safe driving.

SUMMARY OF THE INVENTION

The present invention relates to a device for shielding the objectionable direct rays of the sun or the glare from on-coming traffic at night to a motorist. The device is comprised of a shielding portion pivotally attached to the lower end of a support arm with sufficient frictional engagement to maintain a selected position of the shielding portion with respect to the support arm. The upper end of the support arm is pivotally attached to a mounting bracket again with sufficient frictional engagement to maintain a selected relationship between the mounting bracket and the support arm.

The shielding portion is of a round-ended rectangular shape of a size just sufficient to obscure objectionable rays of sun or glare from headlights of on-coming automobiles without obstructing the normal field of vision required by the driver.

A length of hook-type pressure sensitive releasably-engaging cloth material is affixed preferably by a cement, along the inner windshield molding forwardly of and above the driver and/or along the side window molding adjacent the driver. A loop pressure sensitive releasable cloth material is affixed on the bottom of the mounting bracket for engaging the hook cloth, thus permitting a motorist to horizontally position the glare eliminating device at any selected area, by bringing the hook and loop materials together in varying horizontal positions, followed by pivoting the support arm for exact vertical placement of the shielding portion.

It is an object of the present invention to provide a novel glare elminating device having a shielding portion easily adjusted to any desired position in front of a driver.

It is another object of the present invention to provide a novel glare eliminating device which effectively eliminates objectionable glare without obstructing visibility.

BRIEF DESCRIPTION OF THE DRAWINGS

Other objects, features and advantages of the invention, together with its organization, construction and operation will be best understood from the following detailed description of a preferred embodiment of the invention, taken in conjunction with the accompanying drawings, on which.

DESCRIPTION OF THE PREFERRED EMBODIMENT

Figure 1:
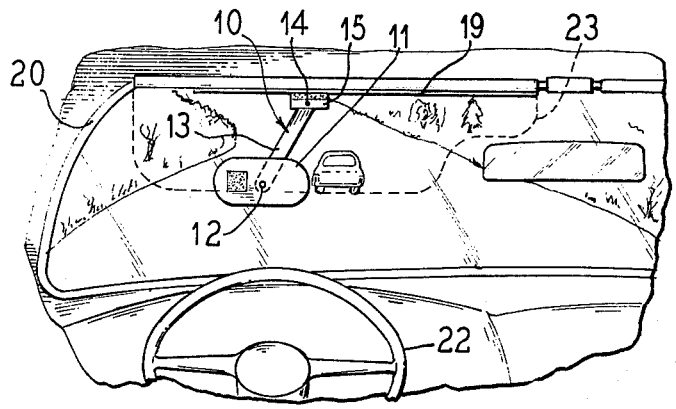
FIG. 1 is a pictorial representation of the view blocked by conventional visors and that of the device of the present invention.
Figure 2:
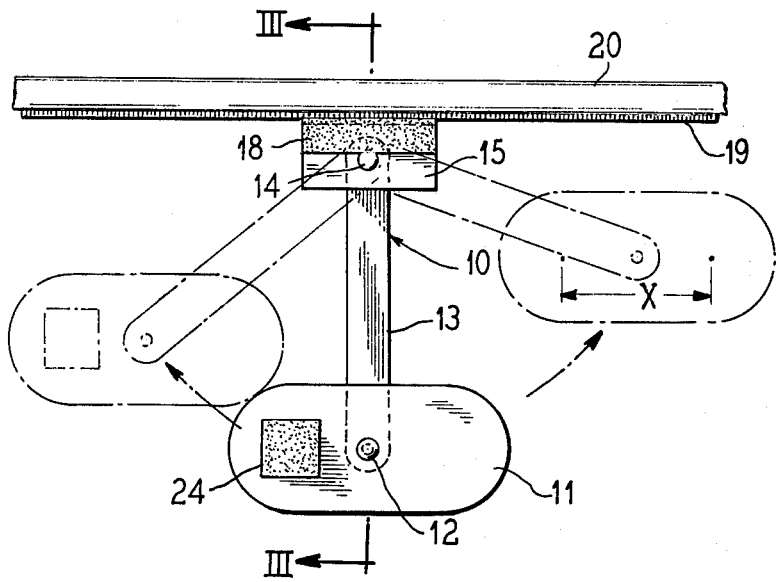
FIG. 2 is a frontal view of the present invention showing the radially adjustable feature.

Referring to FIG. 1, a glare eliminating device indicated generally by the reference numeral 10 includes a shielding portion 11 having a rectangular shape with rounded ends of the approximate dimension of 4 inches in length and 1½ inches in width. The shape (as best shown in FIG. 2) of the shielding portion 11 is chosen with the dimension X equalling about 2.50 inches, approximating an average eye pupil-to-pupil distance to completely block the objectionable glare from impinging upon both eyes of the motorist, while leaving unobstructed the greatest possible field of vision. As a result of the optical phenomenon referred to as "Binocular Diplopia" occurring under normal vision, the shielding portion 11 will be reduced, in the mind of the motorist, to a black, generally circular-shaped spot of approximately one-half the width of the shielding portion 11, which spot covers the sun effectively for both eyes.

Figure 3:
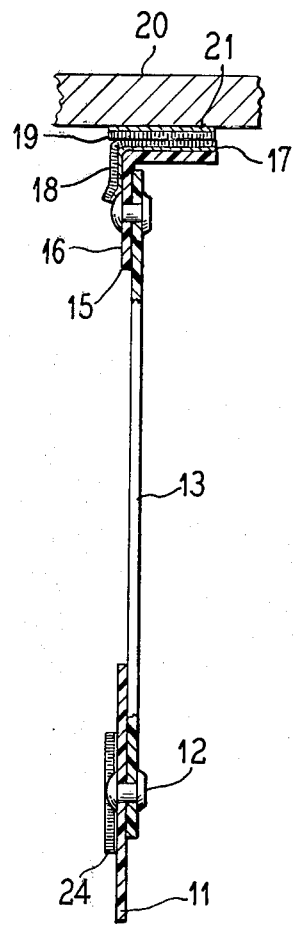
FIG. 3 is a side view taken along lines III—III of FIG. 2.

The shielding portion is pivotally attached by means of a rivet 12 to the lower end of a support arm 13. The upper end of the support arm 13 is pivotally attached by means of a rivet 14 to an L-shaped mounting bracket 15. The L-shaped configuration of mounting bracket 15 is best seen in FIG. 3. The rivet 14 provides sufficient frictional engagement between the support arm 13 and the mounting bracket 15 to retain the selected relative positions of the arm 13 and the mounting bracket 15 after adjustment. A similar frictional engagement is provided by the rivet 12 between the shielding portion 11 and the support arm 13.

Permanently affixed by means of a suitable adhesive 17 to the outer side 16 of the L-shaped bracket 15 is a loop layer of a pressure sensitive releasably-engaging cloth 18, such as is commonly sold under the Trademark VELCRO. A mating hook layer of a pressure sensitive releasably-engaging cloth 19 is permanently affixed by means of any suitable adhesive 21 to the upper inner windshield molding 20.

The mating hook layer of the pressure sensitive releasably-engaging clotch 19 may be placed along the entire curved length of the side and upper windshield molding 20 forwardly of, and generally above, the steering wheel 22 of the automovile. Thus, the glare eliminating device 10 is selectively positionable at any horizontal or vertical location in front of the driver by bringing the hook layer 19 in contact with the loop layer 18. Vertical adjustments of the shielding portion 11 are achieved by radially moving the support arm 13 about the pivotal attachment to the mounting bracket 15, as shown in FIG. 2.

The shielding portion 11, support arm 13 and the L-shaped mounting bracket 15 are all made of a suitable opaque black material such as XP Bakelite to insure effective shielding of objectionable rays of the sun or the glare from on-coming traffic.

It is to be noted by looking at FIG. 1 that the glare eliminating device constructed in accordance with the present invention will effectively screen objectionable glare from the driver with absolute minimum obstruction of the area required by a conventional sun visor 23 (indicated in dotted lines).

Figure 4:
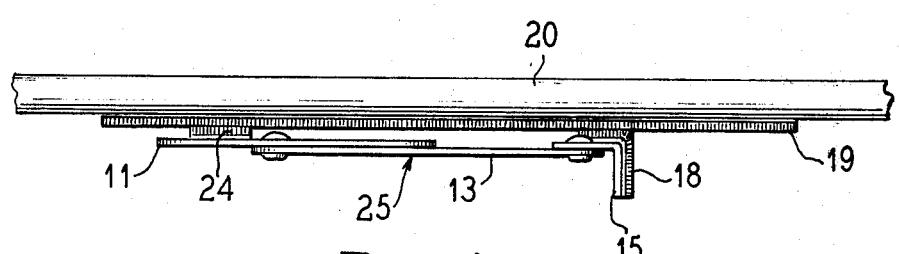
FIG. 4 is a pictorial representation of the present invention in a stored position.

The device is also provided with a convenient method of storage, as shown in FIG. 4. A small square 24 of the loop pressure sensitive releasably-engaging material is affixed to the shielding portion 11. The small square 24 and the layer of loop pressure sensitive releasably-engaging means 18 located on the L-shaped mounting bracket 15 cooperate to affix the glare eliminating assembly 25, which is made up of the shielding portion 11, the support arm 13, and the mounting bracket 15, to the inner upper windshield molding 20 for easily accessible storage.

It will be apparent that the hook and loop portions of the fabric may be reversed, if desired. I have observed that the fabric-type fastener described herein provides a damping effect upon the suspended shield portion which insulates the shield from undue vibrations in operating, thereby permitting simple and inexpensive rivet connections. As a result of the described construction, a maximum shielding effect is provided, with minimum vision obstruction and a minimum cost.

It will be seen that the securing cloth may be applied to any of the upper window moldings of a vehicle to prevent glare. However, for purposes of driving, the preferred mounting position are the windshield and the driver's side window, at both of which positions I have found substantially improved vision. Since variations may be made without departing from the novel concepts of my invention, it is intended that the scope of the invention be limited solely by the hereinafter appended claims.

I claim as my invention:

1. A glare eliminating device for use on vehicles, comprising:
    a flat support arm having an upper and lower end,
    a flat shielding portion of an opaque material pivotally attached centrally to said lower end of said support arm,
    an L-shaped mounting bracket comprised of a bottom surface and an upright rib, pivot means attaching said rib to said upper end of said support arm providing for pivotal movement in the plane of said rib,
    a surface of pressure sensitive releasably-engaging means affixed to said bottom surface of said L-shaped mounting bracket,
    and a cooperating surface of pressure sensitive releasably-engaging means affixed to an area forwardly and above the steering wheel of an automobile,
    whereby said glare eliminating device can be horizontally positioned by selectively bringing the cooperating surface of pressure sensitive releasably-engaging means of said L-shaped mounting bracket in contact with a selected point on said surface of pressure sensitive releasably-engaging means, and can be vertically adjusted by radial movement of said support arm to position the shielding portion in any selected area in front of the driver, thereby obscuring objectionable sunlight or headlights of on-coming cars while driving at night.

2. A glare eliminating device in accordance with claim 1, wherein
    said L-shaped mounting bracket has a loop surface of pressure sensitive releasably-engaging means disposed on said upwardly extending rib,
    said shielding portion has a loop surface of pressure sensitive releasably-engaging means disposed on a side thereof corresponding to said loop surface of pressure sensitive releasably-engaging means disposed on said upwardly extending rib,
    said cooperating surface has a hook fabric surface of pressure releasably-engaging means affixed to the area directly above the steering wheel of the automobile in a horizontal position,
    whereby said glare eliminating device may be stored by bringing the loop surface of pressure sensitive releasably-engaging means of said L-shaped mounting bracket and said shielding portion in close contact with said hook surface of pressure sensitive releasably-engaging means located above the steering wheel of the automobile for storage of said glare eliminating device in a horizontal position.

3. A glare eliminating device in accordance with claim 1, wherein said shielding portion has a rectangular shape with rounded ends, a length slightly in excess of the human pupil-to-pupil distance, whereby said shielding portion is of minimum size to effectively obscure objectionable glare from a two-eyed human motorist while leaving a minimally obstructed field of vision to the motorist.

4. The device of claim 3, wherein the length overall approximates 4 inches and a width of about 1.5 inches is provided.

5. A glare eliminating device for use on vehicles, comprising:
    a flat opaque support arm having an upper and lower end,
    a flat rectangular-shaped shielding portion having generally rounded ends of a light filtering or obstructing material pivotally attached in frictional engagement centrally to said lower end of said support arm,
    an L-shaped mounting bracket comprised of a bottom surface and a transversely extending side having said side pivotally attached in frictional engagement to said upper end of said support arm,
    a loop fabric surface of pressure sensitive releasably-engaging means affixed to said bottom surface, said side of said L-shaped mounting bracket and to said shielding portion in cooperative relationship to said upwardly extending side of said mounting bracket,
    a hook fabric surface of pressure sensitive releasably-engaging means affixed to the area directly above the steering wheel of a vehicle in a horizontal position,
    whereby said glare eliminating device can either be horizontally positioned by selectively bringing the loop surface of pressure sensitive releasably-engaging means of said L-shaped mounting bracket in contact with a selected point on said hook surface of pressure sensitive releasably-engaging means, and vertically adjusted by the radial movement of said support arm to position the shielding portion in any area in front of the driver, thereby obscuring objectional sunlight or headlights of on-coming cars or stored by bringing the loop surface of pressure sensitive releasably-engaging means of said L-shaped mounting bracket and said shielding portion in contact with selected points on said hook surface.

* * * * *